(12) United States Patent
Copper et al.

(10) Patent No.: US 6,301,243 B1
(45) Date of Patent: Oct. 9, 2001

(54) METHOD AND APPARATUS FOR TRANSMITTING DATA

(75) Inventors: Andrew James Copper, Boulder, CO (US); Andrew Johnson, Surrey (GB); David Robert Weston, Oxfordshire (GB); David Alan Woodfield, Walsall (GB); Anthony Stephen Walton, Surrey (GB)

(73) Assignee: Two Way TV Limited, London (GB)

( * ) Notice: Subject to any disclaimer, the term of this patent is extended or adjusted under 35 U.S.C. 154(b) by 0 days.

(21) Appl. No.: 09/203,967

(22) Filed: Dec. 2, 1998

(30) Foreign Application Priority Data

Dec. 2, 1997 (EP) .................................................. 97309670

(51) Int. Cl.$^7$ ...................................................... H04J 3/24
(52) U.S. Cl. ............................ 370/349; 370/437; 370/461
(58) Field of Search ................................... 370/310, 329, 370/336, 339, 345, 346, 347, 348, 349, 350, 360, 375, 376, 377, 422, 426, 437, 442, 443, 445, 447, 448, 458, 461, 462, 498; 340/870.11, 870.13, 870.14

(56) References Cited

U.S. PATENT DOCUMENTS

| 4,536,875 | * | 8/1985 | Kume et al. | 370/448 |
| 4,598,285 | * | 7/1986 | Hoshen | 340/825.5 |
| 4,924,216 | | 5/1990 | Leung | 463/38 |
| 5,303,234 | * | 4/1994 | Kou | 370/442 |
| 5,822,315 | * | 10/1998 | Seze et al. | 370/337 |
| 6,184,798 | * | 2/2001 | Egri | 340/870.13 |

FOREIGN PATENT DOCUMENTS

| 0649102 | 4/1995 | (EP) . |
| 61033060 | 2/1986 | (JP) . |
| 01024536 | 1/1989 | (JP) . |
| 9637866 | 11/1996 | (WO) . |

* cited by examiner

Primary Examiner—Kwang B. Yao
(74) Attorney, Agent, or Firm—Price and Gess

(57) ABSTRACT

A method of transmitting items of information from a plurality of data sources (25–28) to a data destination (9) over a common data channel. The method comprises:

transmitting the items of information from each data source to the data destination as a series of data packets (70–73), each data packet being separated from successive data packets transmitted by the same data source by a repetition period, the repetition period of each data source being different from the repetition periods of the other data sources; and repeatedly transmitting each item of information from the same data source in at least N adjacent data packets, where N is the number of data sources, in order to ensure that at least one of the N successive data packets is received at the data destination without overlapping with data packets from the other data sources, wherein Period $n = 2*\text{burst period}*[(N-1)^2 + n]$ where Period n is the repetition period of the nth data source and burst period is a parameter related to the length of the data packets.

17 Claims, 4 Drawing Sheets

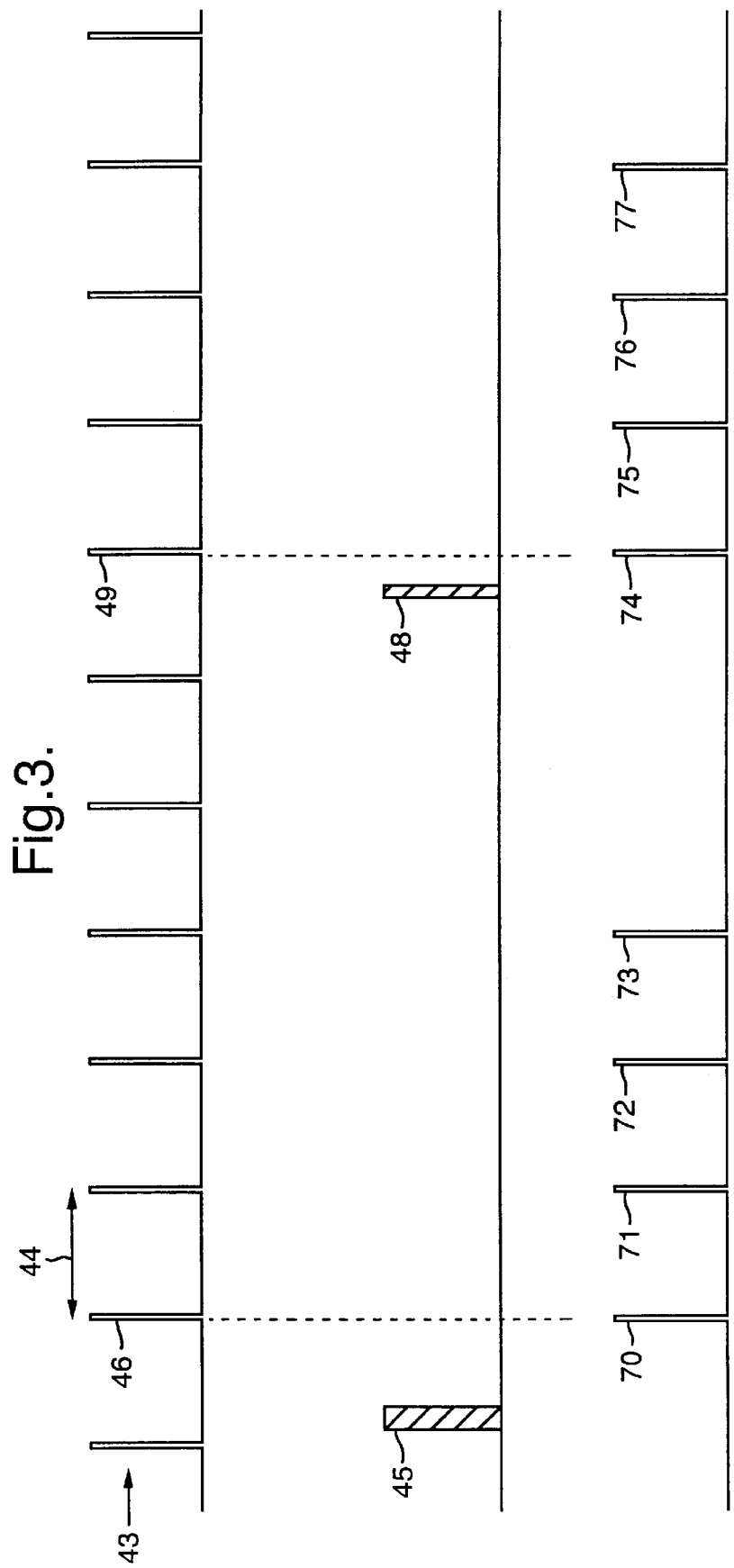

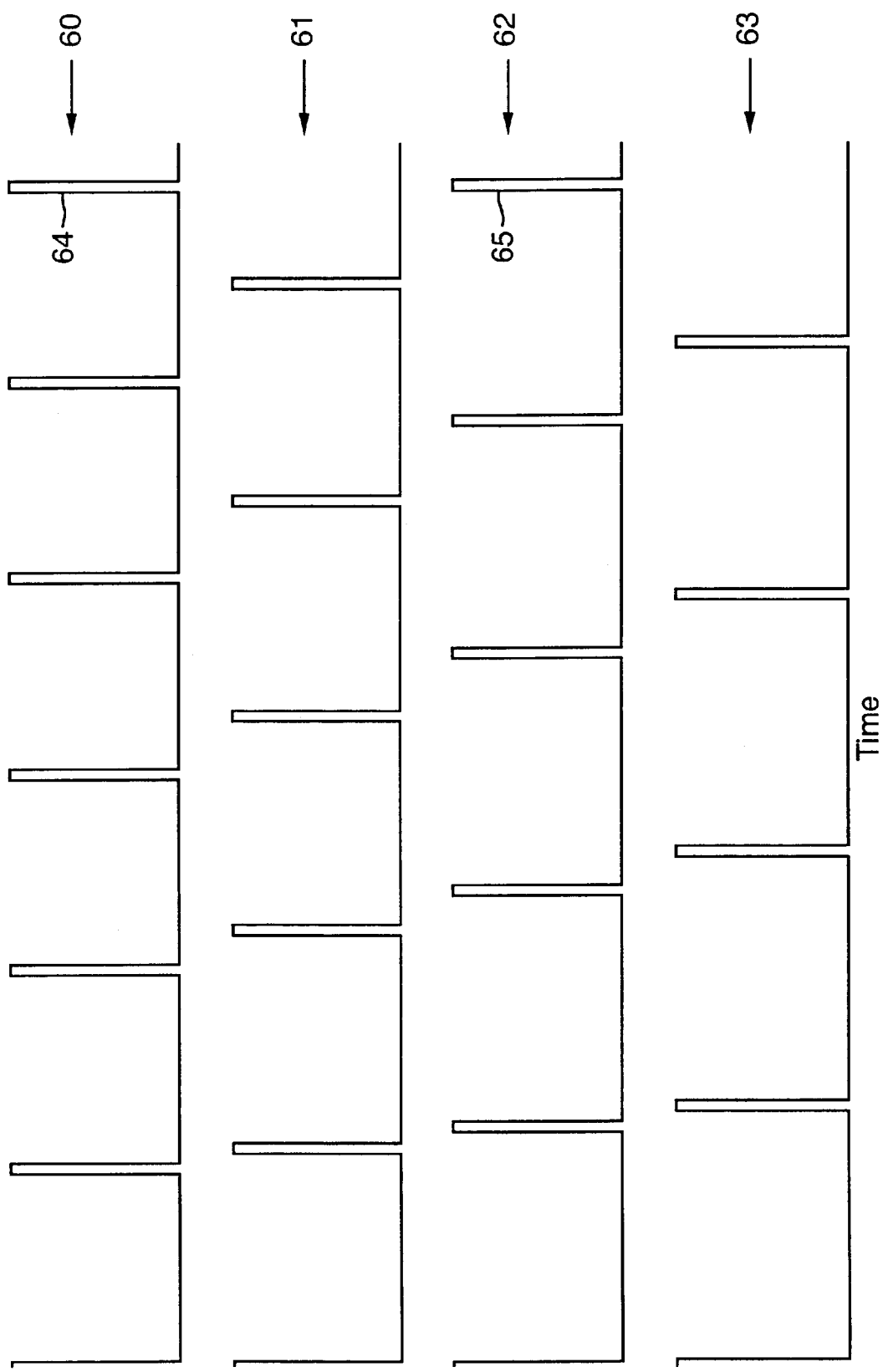

METHOD AND APPARATUS FOR TRANSMITTING DATA

FIELD OF THE INVENTION

The present invention relates to a method and apparatus for transmitting items of information from a plurality of data sources to a data destination over a common data channel.

DESCRIPTION OF THE PRIOR ART

An example of a system of this type is an interactive home entertainment games console. A number of players are each provided with a handset. Each player presses buttons on their respective handset, causing the handset to generate game-play data which is transmitted via an infra-red link to a central game controller.

Since all handsets are transmitting over a common infra-red data channel it is necessary to multiplex the data from the different handsets. Conventionally this is achieved by time division multiplexing in which each handset transmits data in a defined time slot. A problem with time division multiplexing is that the handsets must be synchronised under control of the central game controller to ensure that only one handset is transmitting at any one time. This requires a two-way link between the handsets and the central game controller, along with additional computing power to provide synchronisation control. As a result the system can be expensive.

U.S. Pat. No. 4,924,216 describes joy stick controller apparatus in which a pair of joy stick controllers may send signal bursts on the same communication channel in the infra-red frequency range by means of an electromagnetic transmission. One joy stick transmits signals having a duration of T0 and a repetition period of T1 while the second joy stick transmits a signal having a duration equal to T0 and a repetition period of T2 where T2 is selected to be at least two T0 greater than T1, at least four times greater than T0 and less than 16.6 milliseconds. This approach is suitable where a simple video game apparatus is concerned but is not suitable more generally in the field of broadcast media control and game playing which involve much more complex signalling arrangements and usually more than two data sources.

SUMMARY OF THE INVENTION

In accordance with a first aspect of the present invention there is provided a method of transmitting items of information from a plurality of data sources to a data destination over a common data channel, the method comprising:

transmitting the items of information from each data source to the data destination as a series of data packets, each data packet being separated from successive data packets transmitted by the same data source by a repetition period, the repetition period of each data source being different from the repetition periods of the other data sources; and repeatedly transmitting each item of information from the same data source in at least N adjacent data packets, where N is the number of data sources, in order to ensure that at least one of the N adjacent data packets is received at the data destination without overlapping with data packets from the other data sources, wherein Period $n = 2*\text{burst period}*[(N-1)^2 + n]$ where Period n is the repetition period of the nth data source and burst period is a parameter related to the length of the data packets.

In accordance with a second aspect of the present invention there is provided communication apparatus comprising a data destination having a receiver for receiving data transmitted over a common data channel; and a plurality of data sources each comprising:

a) a transmitter for transmitting items of information to the data destination over the common data channel; and b) a processor for controlling the transmitter such that the transmitter transmits the items of information as a series of data packets, each data packet being separated from successive data packets transmitted by the same data source by a repetition period, and each item of information being transmitted in at least N adjacent data packets from the same data source, where N is the number of data sources, wherein the repetition period of each data source is different from the repetition periods of the other data sources, and wherein Period $n = 2*\text{burst period}*[(N-1)^2 + n]$ where Period n is the repetition period of the nth data source and burst period is a parameter related to the length of the data packets.

The present invention provides a particularly convenient method of multiplexing without requiring any two-way communication or synchronisation between the data sources and the data destination. The system is also robust and can cope with drift in the repetition periods of the data sources without significantly affecting the reliability of transmission. As a result much cheaper components can be used than in previous systems.

The repetition period is typically defined by the time between the start of two successive data packets. Depending on the coding scheme the data packets may always have the same length or may have a length which varies in accordance with the amount of information being transmitted by the data packet. However in both cases each data source typically has a predetermined maximum data packet length, ie. a limited time slot in which the data source is permitted to transmit data.

Each data source may have different maximum data packet lengths. For instance the data source with the shortest repetition period may have a shorter maximum data packet length (and hence each data packet transmits less data) than the data source with the longest repetition period. However preferably each data source has the same maximum data packet length.

Each item of information may be repeated over more than N data packets. However preferably each item of information is transmitted from the same data source in N data packets in order to optimise the data rate.

One or more of the data sources may have a repetition period which varies during the transmission of the N successive data packets. However preferably each data source has a repetition period which remains substantially constant (apart from the effect of drift) at least during the transmission of the N successive data packets, and preferably at all times.

The repetition periods of the data sources may be unequally spaced. For example four data sources may be provided with repetition periods of 20 ms, 22 ms, 26 ms, and 28 ms. However in a preferred example the repetition periods of the data sources are equally spaced.

In this invention, the difference in repetition period between any two data sources is great enough so that if overlap occurs between two data packets, it will not occur between the same two data sources on the next two data packets. Also, the difference in repetition period between any two data sources is small enough that if the data packets from two handsets overlap once they will not overlap again for at least another N repetition periods.

The method may be employed in any communication system which transmits data from a number of sources over a common data channel.

The invention can be implemented to transmit items of information to a variety of data destinations. However, the invention is particularly suited to a method of controlling a broadcast media receiving system, the method comprising transmitting control items of information to the broadcast media receiving system using a method according to the first aspect of the invention.

The invention also provides broadcast media receiving apparatus comprising a broadcast media receiving system; and communication apparatus according to the second aspect of the invention for controlling the broadcast media receiving system.

The broadcast media receiving system may comprise an analogue and/or digital broadcast media receiving system and will typically include a set top box (STB) or an integrated TV or video cassette recorder (VCR) which in one example is controlled by items of information supplied from the data sources. These data sources typically comprise remote control apparatus.

For example, each data source could comprise a remote control including a plurality of input buttons representing numbers, channels, TV operations, VCR operations, and/or STB operations with an optional direction device made up of two or more buttons representing up and down, and/or left and right etc. or a mouse/rollerball/strain gauge type XY pointer apparatus for providing signal information.

The broadcast media receiving system will usually include a receiver which can be tuned to one of a number of different broadcast channels and in one example the communication apparatus is adapted to control the channel to which the broadcast media receiver is tuned. Alternatively, channel selection may be achieved separately from the data sources.

Alternatively, or in addition, the broadcast media receiving system may include a broadcast media receiver adapted to receive game data, the data sources being adapted to generate game play data which is transmitted to a game controller of the broadcast media receiving system. The broadcast signals may relate solely to the game data but in a preferred arrangement, the game data is broadcast in association with TV programmes or the like to which the game data is related. An example of such a system is described in EP-A-0873772.

When used in conjunction with a game, the method may further comprise calculating a time stamp value in accordance with the time delay between generating the item of information and transmitting the data packet; encoding the time stamp value in the data packet; decoding the data packet at the data destination to retrieve the time stamp value; and calculating the time delay associated with the data packet in accordance with the retrieved time stamp value. This is described in more detail in our copending US patent application claiming priority from European Patent Application No. 97309664.7.

At the simplest level the item of information may be encoded in a single bit of binary data (ie. a "1" or a "0"). Alternatively the item of information may be encoded in a string of bits of binary data, the number of bits depending on the requirements of the system. Typically each data packet includes an identifier which identifies the originating data source, along with a data field which encodes the item of information. The data in the data field may also be encoded with a time stamp. The time stamp may be an absolute time stamp—in this case the time stamp will not change between the N adjacent data packets. However in a preferred embodiment each time stamp is a relative time stamp which is calculated in accordance with the time delay between generating the item of information and transmitting the data packet. In this preferred case the N successive data fields will carry different data (as a consequence of their different relative time stamps) but each data field encodes the same item of information.

BRIEF DESCRIPTION OF THE DRAWINGS

An embodiment of the present invention will now be described with reference to the accompanying drawings, in which:

FIG. 3 illustrates the transmission of data packets from one of the handsets; and FIG. 4 illustrates the different time slot pulses generated by the four handsets.

DESCRIPTION OF THE EMBODIMENT

Figure 1:
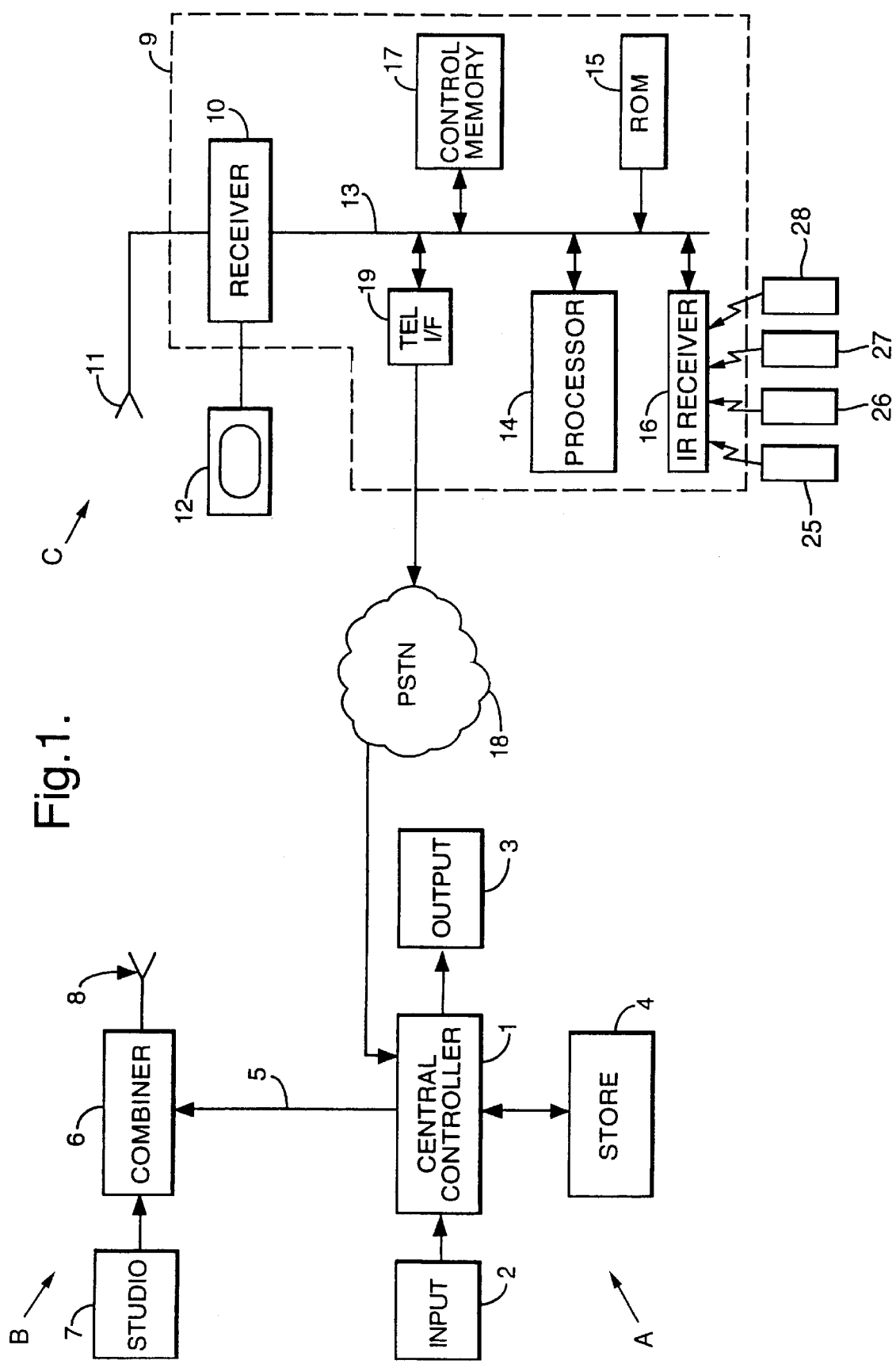
FIG. 1 is a schematic block diagram of an interactive broadcast network.

The interactive broadcast network shown in FIG. 1 comprises a game control system A at a central site and including a central controller 1 which will include a computer such as a PC operating a Windows based system, connected to an input device 2 such as a keyboard and/or mouse and the like and to an output device 3 which may include a monitor and/or printer. A store 4 contains a database storing data relating to service functions and remote users, which can be accessed and amended by the central controller 1, and a Live File store storing data relating to the game being or to be broadcast. The central controller 1 generates data which can be converted to TV display signals and other control signals associated with various service functions, on a land line 5 connected to a combining unit 6 defining an insertion point of a TV broadcast system B. The combining unit 6 receives television broadcast signals from a studio 7 (or outside broadcast (OB) location, in the case of a live event), and combines these with the signals on the line 5 so that they are transmitted simultaneously by a transmitter 8 to remote users or players C. In other applications, the signals from the central controller 1 and the studio or OB 7 will be transmitted separately.

The signals applied to the combiner 6 may be transmitted to the remote units within a vertical blanking interval (VBI) of the normal TV signal or on a separate radio FM-SCA channel or other data format such as a cable modem, or the Internet. Typically, the transmitted signals will be in digital form but the invention is also applicable to analogue signals.

Each remote user C has a home or remote unit 9 formed by a Set Top Box (STB) having a tunable television receiver 10 connected to an aerial 11 and a monitor 12. The home unit 9 includes an address/databus 13 connected to the receiver 10, the bus 13 being connected to a microprocessor 14, a memory 15, such as a ROM, storing programme instructions for the processor 14, an infra-red receiver 16, and a control memory (RAM) 17. Signals transmitted by the processor 14 can be communicated to the central controller 1 via a public switched telephone network 18 which is selectively accessed by a telephone interface unit 19 connected to the bus 13.

Alternative media such as cable or the internet can be used for the return signals (as for the signals transmitted to the remote unit C). In general the return signals will be transmitted over a different medium to the incoming signals.

The game control system A can be used to control a variety of games including interactive, predictive games and two examples of such interactive, predictive games are described in EP-A-0873772 incorporated herein by reference. In the first example, play live football, the remote players are able to attempt to predict certain events prior to commencement of a live football match which is broadcast by the transmitter 8 and can also attempt to predict certain events during the live broadcast. In the second example, a predictive game for use with broadcast horse racing is described.

The invention is also concerned with games which can be played between participants at the same remote location C. These may be, for example, games based on quiz shows and the like where a question is presented with a set of multiple choice answers and the users at the remote location C must compete together to be the first to answer correctly from a multiple selection of answers. The questions may or may not be linked to a quiz show being broadcast simultaneously.

In order to enable the users to communicate with the STB 9, each user has his own handset 25–28 which is physically separate from the STB 9 but can communicate with the IR receiver 16 of the STB 9 via signals generated in the infra-red waveband. The IR receiver 16 then converts those signals for supply to the processor 14 along the data bus 13.

As mentioned above, each remote handset 25–28 can have a variety of control buttons provided as is well known in the art. Each handset can be used to control the channel to which the receiver 10 is tuned, the tuning being effected via the processor 14. In addition, each remote handset 25–28 can be used to control the location of a respective cursor (not shown) displayed on the monitor 12, movement of a button or the like on the remote handset generating signals to which the processor 14 responds by causing equivalent movement of the cursor about the display screen of the monitor 12. A further button is provided to enable the user to "select" an item indicated by the cursor in those applications where this is necessary.

Figure 2:
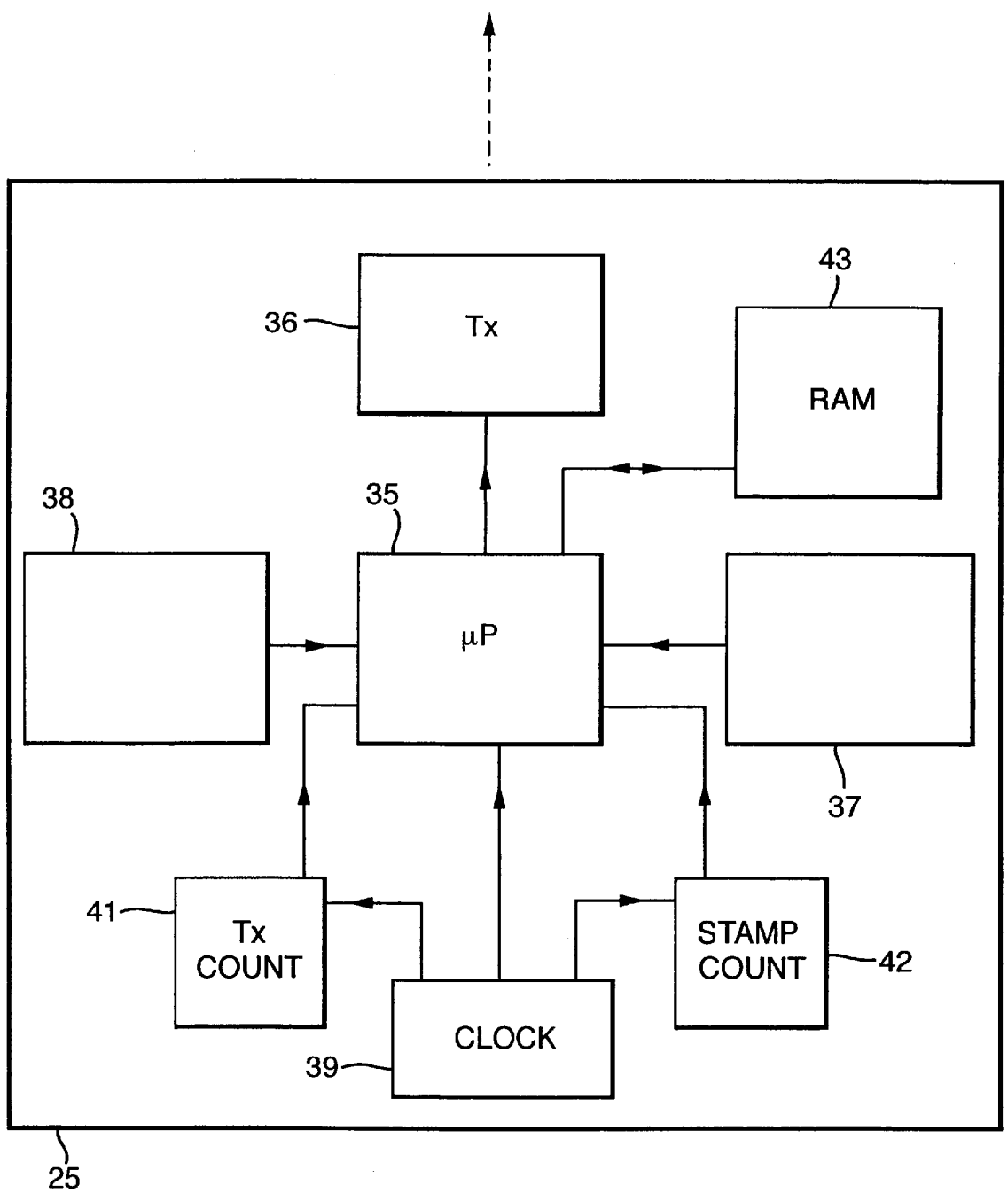
FIG. 2 shows the game controller and one handset in more detail.

Each handset 25–28 has substantially the same construction and the construction of the handset 25 will be described in more detail with reference to FIG. 2.

The remote handset comprises a central microprocessor 35 which controls an infra-red transmitter 36 as discussed below. A cursor control device 37 generates signals for controlling the position of the respective one of the cursors on the monitor 12, and an array of user actuable buttons 38 feed data to the microprocessor 35. An oscillator 39 (such as a quartz crystal or ceramic resonator) generates a 115200 Hz clock signal with an accuracy of approximately 1%. The clock signal is fed to the microprocessor 35, to a transmit time slot counter 41, and to a time stamp counter 42.

Referring to FIG. 3, the transmit time slot counter 41 cyclically counts for a selected number of clock cycles and generates a time slot pulse 43 once every cycle, with a repetition period 44 between successive time slot pulses 43. In the case of handset 25 the repetition period 44 is 20 ms. When one of the array of buttons 38 is pressed, an item of information 45 is generated which is stored in RAM 43 by the microprocessor 35. When the next time slot pulse 46 is received, the microprocessor 35 reads the stored information from RAM 43 and repeatedly transmits it in four successive data packets 70–73 via infra-red transmitter 36. The cursor control device 37 subsequently generates an item of information at 48 which is stored in RAM 43. When the next time slot pulse 49 is received, the microprocessor 35 reads the stored information from RAM 43 and repeatedly transmits it in four successive data packets 74–77 via infra-red transmitter 36.

The time stamp counter 42 starts counting every time at item of information is generated by the buttons 38 or cursor control device 37. The time stamp counter 42 increments twice every repetition period (ie. every 10 ms in the case of handset 25) and the present value of the time stamp counter 42 is added to each data packet. For instance the button data 45 is generated 18 ms before the time slot pulse 46. Therefore the four data packets 70–73 are time stamped with time stamp values 1,3,5 and 7 respectively. In contrast the cursor control data 48 is generated only 5 ms before the time slot pulse 49. Therefore the four data packets 74–77 are time stamped with time stamp values 0,2,4 and 6 respectively.

Each data packet carries 80 bits which are transmitted at a bit rate of 115200 Hz over a data packet length of 0.69 ms. Each data packet comprises an identifier to identify which handset 25–28 has generated the data packet, a data field and a check field. The data field is encoded to contain the information stored in RAM 23, along with a time stamp value from counter 42.

Referring to FIG. 4, the transmit time slot counters 41 of the four handsets 25–28 are each programmed to generate time slot pulses at different repetition rates. The first handset 25 has a transmit time slot counter 41 which counts 2304 clock cycles and generates a time slot pulse 60 every 20 ms. In contrast, the transmit time slot counter in the second handset 26 counts 2534 clock cycles and generates a time slot pulse 61 every 22 ms. The third and fourth handsets 27,28 generate time slot pulses 62,63 with repetition periods of 24 ms and 26 ms respectively.

Because the time slot pulses 60–63 are not synchronised, their timing relationship will drift. Rather than try to synchronise the handsets, their repetition periods are deliberately set to be slightly different so that their relative phases are constantly changing. This will occasionally cause overlap as two handsets send two data packets at once. For instance, in FIG. 4 time slot pulse 64 from handset 25 overlaps with time slot pulse 65 from handset 27. When this happens, any data packets sent in response to the time slot pulses 64,65 will be corrupted. So as to avoid loss of data, each item of information is repeated four times by each handset.

The microprocessor 14 in the STB 9 decodes each data packet as it arrives, and sends display signals to the monitor 12 in response to the information carried by the data packet. The microprocessor 14 knows the repetition period of each handset. When it receives a data packet it checks the time stamp value and calculates the time delay.

For example, referring to FIG. 3, the first data packet 70 has a time stamp value of 1. Therefore the microprocessor 14 knows that the button data 45 was generated 10–20 ms before the data packet 70 was transmitted. The microprocessor 14 also accounts for any delays in receiving and processing the data packets. if the first data packet 70 overlaps with another data packet, or is lost due to other interference, then the microprocessor can simply decode the next data packet 71 to retrieve the same information. In this case the time stamp value is 3, indicating that the button data 45 was generated 30–40 ms before the data packet 71 was transmitted. By calculating the actual time that the buttons 38 were pressed, rather than the time that the data packets are received, the microprocessor 33 can make correct decisions in time critical action games, and can also calculate the correct order that buttons were pressed across all four handsets.

By carefully selecting the data packet lengths and repetition periods as discussed below, clear reception of at least one copy of each item of information can be guaranteed whilst the data rate of each handset is maximised.

In this example the difference in repetition period between each handset is chosen to be equal. Therefore the repetition period of each handset is given as follows:

Period $n$=Period 1+$(n-1)$ Delta where "Period n" is the repetition period of the nth handset, and "Delta" is the difference in repetition period where n is an interger greater than zero.
Therefore Period 2=Period 1+Delta Period 3=Period 2+Delta Period 4=Period 3+Delta Delta must be great enough so that if any overlap occurs it will not occur between the same two handsets on the next data packet. The infra-red receiver 16 will also have a characteristic recovery time. In addition the oscillator 39 may drift causing a change in bit rate. This results in the following constraint:

Delta$\geq$2*(burst length), where burst length=data packet length+recovery time+bit rate accuracy.

In the example given above, the data packet length is determined by the bit rate (115200 Hz) and number of bits per data packet (80) as 80/115200=0.694 ms. A typical value of the recovery time is 0.3 ms. Typically the bit rate is accurate to 1%. As a result the burst length is typically 1 ms, giving Delta a minimum value of 2 ms.

The difference in repetition period between any two transmitters must also be small enough such that if the data packets from two handsets collide once, they will not collide again until the data packet has changed. This results in the following constraint:

$(N-1)$*(Period $N$)+2*(burst length)$\leq$N*Period 1 where N is the number of transmitters (in this case four).

To maximise data rate and minimise delay, the repetition periods should be as short as possible. Combining the above constraints gives the following optimum relationship between the burst length and the repetition period:

Period $n$=2*(burst length)*$[(N-1)^2+n]$.

So the optimum repetition periods for the four handset system of FIG. 1 are:

Period 1=20*burst length=20 ms

Period 2=22*burst length=22 ms

Period 3=24*burst length=24 ms

Period 4=26*burst length=26 ms

As the repetition period is proportional to the data packet length, the data packet length can be chosen to suit the delay requirements of the system without affecting the overall data capacity.

The handset with the longest repetition period transmits data at a lower rate than the handset with the shortest repetition period. However the players will rarely press the buttons 38 quickly enough to generate a continuous series of data packets. Therefore the difference in data rates is generally not a problem. However if the differing data rates become a problem, then the system can be adapted to transmit more bits in the less frequent data packets. For instance the four handsets 25–28 could transmit data packets containing 80,88,94 and 102 bits respectively.

In an alternative embodiment, the microprocessor 35, oscillator 39, transmit time slot counter 41 and time stamp counter 42 are replaced by a dedicated IC (not shown) which performs the same functions.

We claim:

1. A method of transmitting items of information from a plurality of data sources to a data destination over a common data channel, the method comprising:

transmitting the items of information from each data source to the data destination as a series of data packets, each data packet being separated from successive data packets transmitted by the same data source by a repetition period, the repetition period of each data source being different from the repetition periods of the other data sources; and repeatedly transmitting each item of information from the same data source in at least N adjacent data packets, where N is the number of data sources, in order to ensure that at least one of the N successive data packets is received at the data destination without overlapping with data packets from the other data sources, wherein Period $n$=2*burst period*$[(N-1)^2+n]$ where Period n is the repetition period of the nth data source and burst period is a parameter related to the length of the data packets and n is an interger greater than zero.

2. A method according to claim 1, wherein the data packets from each data source are transmitted over a wireless link.

3. A method according to claim 2, wherein the wireless link is an infra-red link.

4. A method according to claim 1, wherein each item of information is transmitted from the same data source in N data packets.

5. A method of controlling a broadcast media receiving system constituting a data destination, the method comprising transmitting control items of information to the broadcast media receiving system from a plurality of data sources over a common data channel by transmitting the items of information from each data source to the data destination as a series of data packets, each data packet being separated from successive data packets transmitted by the same data source by a repetition period, the repetition period of each data source being different from the repetition periods of the other data sources; and repeatedly transmitting each item of information from the same data source in at least N adjacent data packets, where N is the number of data sources, in order to ensure that at least one of the N successive data packets is received at the data destination without overlapping with data packets from the other data sources, wherein $$\text{Period } n = 2 \ast \text{burst period} \ast [(N-1)^2 + n]$$

where Period n is the repetition period of the nth data source and burst period is a parameter related to the length of the data packets and n is an interger greater than zero.

6. A method according to claim 5, wherein the items of information control a channel to which the broadcast media receiving system is tuned.

7. A method according to claim 5, wherein the broadcast media receiving system is adapted to receive broadcast game data, the data sources being adapted to generate game play data which is transmitted to a game controller forming part of the broadcast media receiving system.

8. Communication apparatus comprising a data destination having a receiver for receiving data transmitted over a common data channel; and a plurality of data sources each comprising:
   a) a transmitter for transmitting items of information to the data destination over the common data channel; and
   b) a processor for controlling the transmitter such that the transmitter transmits the items of information as a series of data packets, each data packet being separated from successive data packets transmitted by the same data source by a repetition period, and each item of information being transmitted in at least N adjacent data packets from the same data source, where N is the number of data sources,
   wherein the repetition period of each data source is different from the repetition periods of the other data sources, and wherein $$\text{Period } n = 2 \ast \text{burst period} \ast [(N-1)^2 + n]$$

where Period n is the repetition period of the nth data source and burst period is a parameter related to the length of the data packets an n is an integer greater than zero.

9. Apparatus according to claim 8, wherein the receiver and transmitters communicate over a wireless link.

10. Apparatus according to claim 9, wherein the wireless link is an infra-red link.

11. Apparatus according to claim 8, wherein each data source comprises an oscillator which controls the repetition period of the data source, wherein the oscillator has an accuracy equal to or worse than 1%.

12. Apparatus according to claim 8, wherein each data source comprises a counter which cyclically counts to generate a time slot clock signal, wherein each processor responds to a respective time slot clock signal to cause the transmitter to transmit a data packet.

13. Apparatus according to claim 8, wherein the data destination is unable to transmit data to the data sources, and the data sources are unable to receive data from the data destination.

14. Broadcast media receiving apparatus comprising a broadcast media receiving system; and communication apparatus for controlling the broadcast media receiving system, the communication apparatus comprising a data destination having a receiver for receiving data transmitted over a common data channel; and a plurality of data sources each comprising:
   a) a transmitter for transmitting items of information to the data destination over the common data channel; and
   b) a processor for controlling the transmitter such that the transmitter transmits the items of information as a series of data packets, each data packet being separated from successive data packets transmitted by the same data source by a repetition period, and each item of information being transmitted in at least N adjacent data packets from the same data source, where N is the number of data sources,
   wherein the repetition period of each data source is different from the repetition periods of the other data sources, and wherein $$\text{Period } n = 2 \ast \text{burst period} \ast [(N-1)^2 + n]$$

where Period n is the repetition period of the nth data source and burst period is a parameter related to the length of the data packets and n is an integer greater than zero.

15. Apparatus according to claim 14, wherein the broadcast media receiving system includes a receiver which can be tuned to one of a number of different broadcast channels, the communication apparatus being adapted to control the channel to which the broadcast media receiver is tuned.

16. Apparatus according to claim 15, wherein the broadcast media receiver can be tuned to one of a number of broadcast TV channels.

17. Apparatus according to claim 14, wherein the broadcast media receiving system includes a broadcast media receiver adapted to receive game data, the data sources being adapted to generate game play data which is transmitted to a game controller of the broadcast media receiving system.

* * * * *